United States Patent
McLaughlin et al.

(10) Patent No.: US 9,847,561 B2
(45) Date of Patent: Dec. 19, 2017

(54) CELL COOLING FRAMES WITH CANTILEVERED SIDE SEALS

(71) Applicant: GM Global Technology Operations LLC, Detroit, MI (US)

(72) Inventors: Barton W. McLaughlin, Troy, MI (US); Charles W. McClure, White Lake, MI (US); Andrew P. Oury, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 743 days.

(21) Appl. No.: 14/309,937

(22) Filed: Jun. 20, 2014

(65) Prior Publication Data

US 2015/0372355 A1 Dec. 24, 2015

(51) Int. Cl.
*H01M 2/10* (2006.01)
*H01M 10/625* (2014.01)
*H01M 10/613* (2014.01)
*H01M 10/6555* (2014.01)
(Continued)

(52) U.S. Cl.
CPC ....... *H01M 10/613* (2015.04); *H01M 2/1077* (2013.01); *H01M 10/625* (2015.04); *H01M 10/6555* (2015.04); *H01M 10/6561* (2015.04); *H01M 10/647* (2015.04); *Y10T 29/49909* (2015.01)

(58) Field of Classification Search
CPC ............ H01M 2/1077; H01M 10/625; H01M 10/613; H01M 10/6555; H01M 10/6561
USPC .................... 429/120, 159; 29/505
See application file for complete search history.

(56) References Cited

U.S. PATENT DOCUMENTS

2008/0124622 A1 * 5/2008 Hamada .............. H01M 2/1077
429/149
2010/0266883 A1 10/2010 Koetting et al.
(Continued)

FOREIGN PATENT DOCUMENTS

JP   WO 2012160696 A1 * 11/2012 .............. H01M 2/00

*Primary Examiner* — Sean P Cullen
(74) *Attorney, Agent, or Firm* — Quinn IP Law

(57) ABSTRACT

A modular battery pack and method of making a battery pack. Prismatic can battery cells are interspersed with cooling frames along a stacking axis within a housing such that numerous a cell-frame assemblies, each with a cooling path, are formed. Resiliently-biased sealing members on the frames are arranged such that they remain out of the way of a footprint defined by the joined cells and frames to promote ease of high-speed cell-to-frame assembly. Upon formation of the cell-frame assembly and subsequent placement into the housing with inner walls that press against the protruding ends of the sealing member, the sealing member is forced by the housing to come into contact engagement with a corresponding surface of the edge of the battery cell. The generally linear, planar contact surface formed by the contact engagement promotes the formation of a sealing surface that makes it harder for introduced cooling air to escape. By this sealing member construction, cell-frame assemblies may be produced with high-speed automated assembly techniques that may have both large manufacturing tolerances prior to assembly and substantially gap-free cell-to-cooling frame contacting surfaces after assembly.

20 Claims, 5 Drawing Sheets

(51) Int. Cl.
*H01M 10/6561* (2014.01)
*H01M 10/647* (2014.01)

(56) References Cited

U.S. PATENT DOCUMENTS

| | | | |
|---|---|---|---|
| 2012/0315508 A1* | 12/2012 | Kurita | H01M 2/1077 |
| | | | 429/7 |
| 2013/0157098 A1 | 6/2013 | McLaughlin et al. | |
| 2013/0255068 A1 | 10/2013 | Turner, III | |
| 2014/0096374 A1* | 4/2014 | Syuto | H01M 2/00 |
| | | | 29/623.1 |

* cited by examiner

CELL COOLING FRAMES WITH CANTILEVERED SIDE SEALS

BACKGROUND OF THE INVENTION

This invention relates generally to cooling structure for battery cells within a battery pack, and more particularly to coupling a battery cell to a cooling frame with integral attachment features to simultaneously promote adequate clearance between the cell and frame during high volume battery pack assembly and sealing of a fluid introduced into a space defined between the cell and the cooling frame once the battery pack has been assembled.

Lithium-ion and related batteries, collectively known as a rechargeable energy storage system (RESS), are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. In one form suitable for automotive applications, individual battery cells (i.e., a single electrochemical unit) are shaped as generally thin rectangular members. The flow of electric current to and from the cells is such that when several such cells are combined into larger assemblies, the current or voltage can be increased to generate the desired power output. In the present context, larger module and pack assemblies are made up of one or more cells joined in series, parallel or both, and may include additional structure to ensure proper installation and operation of these calls. Although the term "battery pack" is used herein to discuss a substantially complete battery assembly for use in propulsive power applications, it will be understood by those skilled in the art that related terms—such as "battery unit" or the like—may also be used to describe such an assembly, and that either term may be used interchangeably without a loss in such understanding.

Temperature is one of the most significant factors impacting both the performance and life of a battery, especially those used in propulsive power for vehicular applications and related high power-demand configurations. Exogenously, environmental conditions (such as those encountered during protracted periods of inactivity in cold or hot environments) are significant factors, while endogenously, the large amounts of electrical energy and concomitant heat generation produced by battery packs, as well as abuse conditions (such as the rapid charge/discharge, or internal/external shorts caused by the physical deformation, penetration, or manufacturing defects of the cells), can negatively impact the ability of the battery to operate correctly. In extreme forms of either case, such temperatures can destroy the battery entirely. With particular regard to prolonged exposure high temperatures, side effects may include premature aging and accelerated power and energy fade, both of which are additionally undesirable.

In one form, the individual cells that make up a battery pack are configured as rectangular (i.e., prismatic) cans that define a rigid outer housing known as a cell case. As with their similarly-shaped prismatic pouch cell counterparts, prismatic can-style cells can be placed in a facing arrangement (much like a deck of cards) along a stacking axis formed by the aligned parallel plate-like surfaces. Positive and negative terminals situated on one edge on the cell case exterior are laterally-spaced from one another relative to the stacking axis and act as electrical contacts for connection (via busbar, for example) to an outside load or circuit. Within the cell case, numerous individual alternating positive and negative electrodes are spaced apart from one another along the stacking direction and kept electrically isolated by non-conductive separators. Leads from each of the negative electrodes are gathered together inside the cell case to feed the negative terminal, while leads from each of the positive electrodes are likewise gathered together to feed the positive terminal.

To help avoid the buildup of excessive heat, cooling systems may be integrated into the battery pack. In the configurations described above—where the battery cells are stacked or arranged in a generally repeating manner—such cooling systems may include means for introducing a cooling medium between individual battery cells. The operation of such cooling systems may be hampered by the expansion and related compressive action of the battery cells in response to temperature increases, as cooling channels that may be present during lower pack temperature tend to reduce in size (or be cut off altogether) in response to individual cell expansion. To prevent the temperature-related problems, frame-like members for holding, mounting or otherwise securing adjacently-stacked battery cells may be used to maintain the channels or related volumetric space formed between them. As such, these frames are often critical to maintaining the dimensional consistency and related sealing integrity between adjacent cells as a way to prevent the inadvertent release of the cooling medium being introduced into the channels or related interstitial volumes. Despite this, the attachment and sealing associated with coupling the frames to the cells requires complicated manufacturing processes. With prismatic can cell configurations in particular, the placement of a cooling frame adjacent a battery cell can have mutually-exclusive interests. For example, trying to ensure a suitably high level of sealing integrity through tight dimensional tolerances hampers high-speed assembly operations, whereas high assembly throughput leaves larger manufacturing tolerances that in turn lead to gaps between the cell and frame that are responsible for most of the coolant losses within the pack.

SUMMARY OF THE INVENTION

The present invention solves the above problems by allowing for clearance (i.e., gap) between an adjacent cooling frame and cell during high-speed automated assembly, while closing this gap once frame and cell have been connected together and placed in a battery cell cage or related housing structure. Examples of such high-speed automated assembly of individual prismatic can cells into larger module or pack structures may be found in a pair of companion patent applications that are owned by the Assignee of the present invention and incorporated herein by reference; these are U.S. application Ser. No. 13/835,858, filed on Mar. 15, 2013 and entitled LARGE FORMAT CELL HANDLING FOR HIGH SPEED ASSEMBLY, and U.S. application Ser. No. 13/972,224, filed on Aug. 21, 2013 and entitled HORIZONTAL HIGH SPEED STACKING FOR BATTERIES WITH PRISMATIC CANS. The coupling of the present invention is beneficial in that it avoids having to use exotic shaped cooling plates or crushable components to effect airflow sealing, and likewise avoids reducing the clearance between each cell and cooling frame to a dimension that is too small for routine module assembly operations.

In accordance with the teachings of the present invention, a modular design for securing one or more prismatic can battery cells into a larger battery assembly (such as a battery module or a battery pack) is disclosed. In the present context, the cage or related housing may define an open box made up of two opposing brackets along one axis and two opposing end plates along an orthogonal axis, all of which may be placed on or formed in conjunction with a tray to act as a modular primary support structure. Also within the present context, the battery pack is considered to be a substantially complete assembly or system of components necessary for propulsion of the vehicle for which the pack was designed, while battery modules and individual battery cells are (as mentioned above) considered to be subcomponents that are subsequently assembled into the pack or other larger part of the overall system. Likewise, an assembly of components for a battery pack used for vehicular applications may include—in addition to numerous battery cells—cooling plates, frames, trays, securing mechanisms and other equipment that, while not contributing to the production of electric power, form an important part of the overall battery system packaging and assembly. Traditionally, all of these components are stacked and joined together in such a way that weight, cost and complexity are increased. By way of example, the frames alone may be as much as 10% of the total weight of the overall battery pack assembly or system, while the inclusion of cooling and sealing functions may significantly add to assembly operation complexity.

Numerous prismatic can battery cells are arranged along a stacking axis such that a corresponding plurality of cooling frames can each be facingly interspersed between an adjacent pair of the cells to define a cell-frame assembly with a cooling path. Each frame includes one or more resiliently-biased sealing members such that upon formation of the cell-frame assembly and subsequent placement into a housing configured to contain the cell-frame assembly, the protruding distal end of the sealing member (which in its normal, undeformed condition is biased away from contact engagement with the cell and therefore outside of a footprint defined by the plate-like surface of the cell) is compressed by the force of the rigid housing inner walls. An opposing surface of the distal ends—by virtue of being remote from the pivot point of its cantilevered surface—then move into contact engagement with a corresponding surface of the edge of the battery cell. Because these contacting surfaces define generally linear, flat structure that touch along significant respective portions parts, they form a sealing surface that makes it harder for introduced cooling air to escape from the cooling path formed between the joined cell and frame.

According to yet another aspect of the invention, a method of assembling a cooling frame to a prismatic can battery cell in an automotive battery pack is disclosed. The method includes providing the frame with one or more resiliently-biased sealing members formed on it. After that, the cooling frame is placed adjacent the cell such that they define a cell-frame assembly with a cooling path between them. Subsequently, the cell-frame assembly is placed into a housing such that the sealing member—which in its natural (i.e., undeformed) condition is situated outside of a footprint defined by the cell—is deformed by the compressive action of a surface of the housing. This deformation of the sealing member causes it to come into contact with an adjacent surface (for example, a lateral edge) on the cell such that a contact engagement is formed. By virtue of the engaged surfaces being substantially flat and planar, this engagement defines a sealing surface for the cooling path that is formed between the assembly's frame and cell. Significantly, this permits cell-frame assemblies to be produced with high-speed automated stacking or joining techniques that have both large manufacturing tolerances prior to assembly and substantially gap-free cell-to-cooling frame contacting surfaces after assembly.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
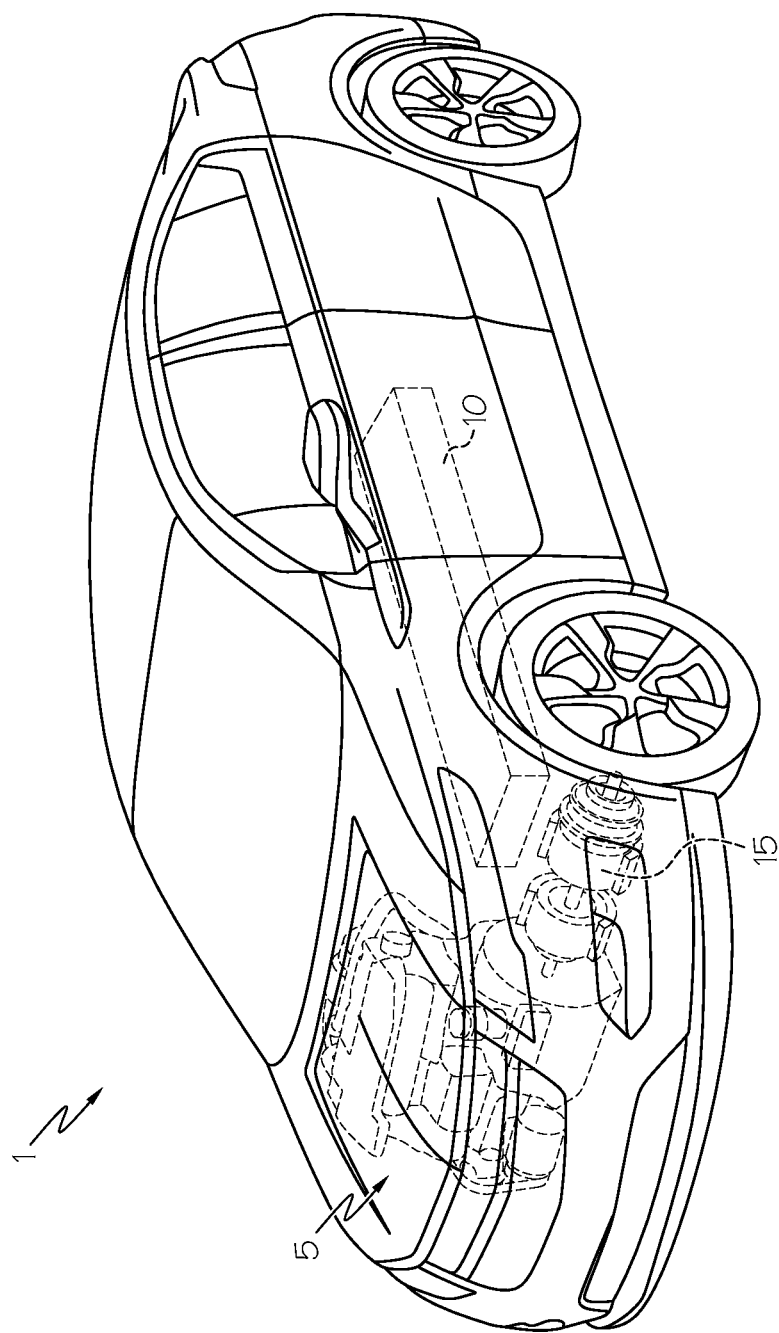
FIG. 1 shows a vehicle with a hybrid propulsion system in the form of a battery pack and an internal combustion engine.

Referring first to FIG. 1, a vehicle 1 includes a hybrid propulsion system in the form of an electric power source made up of a conventional ICE 5 and a battery pack 10, both cooperative with an electric motor 15. Such a vehicle is known as a hybrid electric vehicle (HEV). It will be appreciated by those skilled in the art that vehicle 1 may not require an ICE 5, in such case, rather than being an HEV, it is an electric vehicle (EV); either form is within the scope of the present invention. Additional drivetrain components (none of which are shown) useful in providing propulsive power to one or more of the wheels and coupled to one or both of the battery pack 10 and ICE 5 are understood to include rotating shafts, axles, transmission, controllers or the like. While vehicle 1 is presently shown as a car, the applicability of the hybrid propulsion system to other such automotive forms (including trucks, buses, aircraft, watercraft, spacecraft and motorcycles) is deemed to be within the scope of the present invention.

Figure 2:
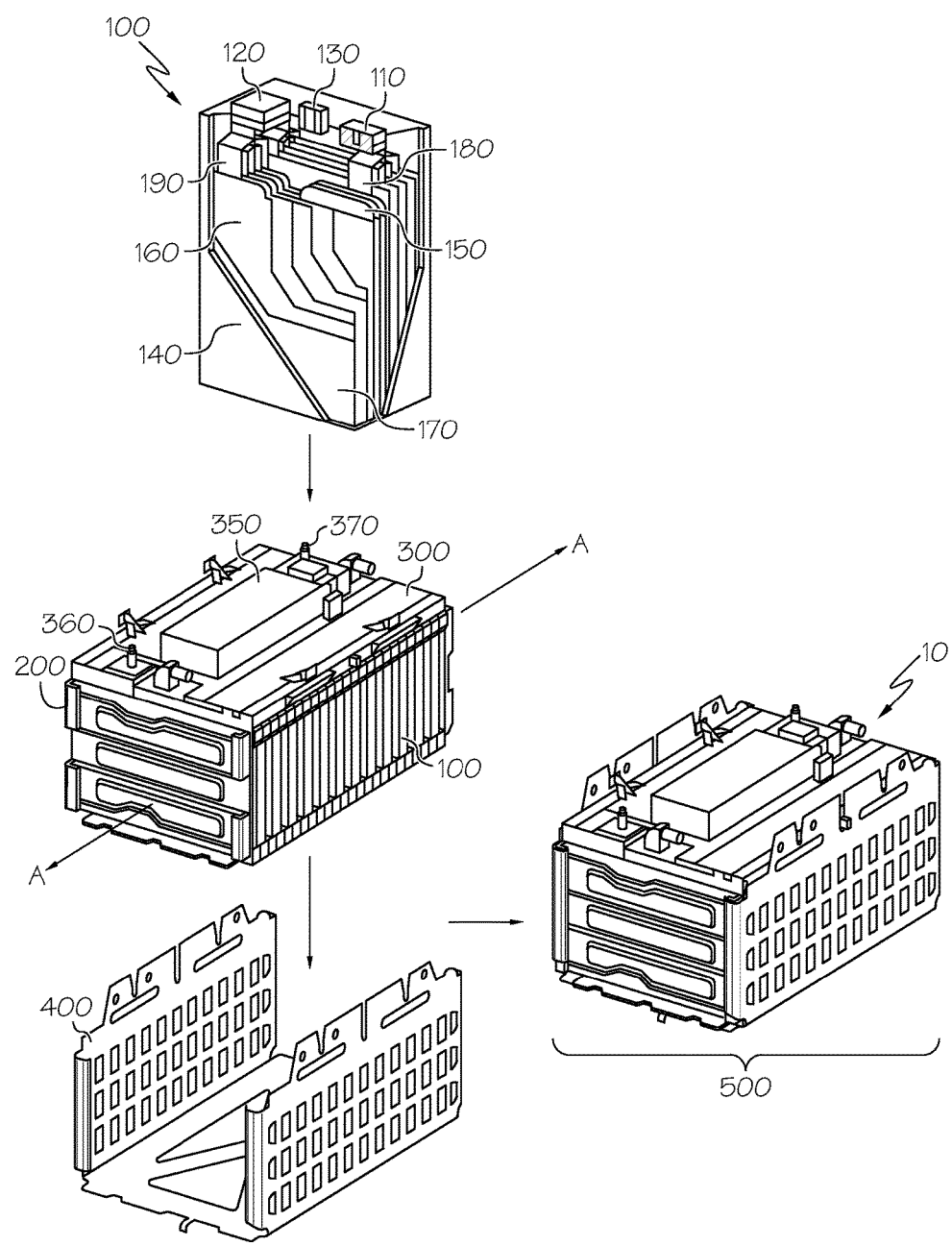
FIG. 2 shows an exploded view of an exemplary battery cell and its relative placement within a housing to define a battery pack or module assembly that can be used in conjunction with the cooling frame of the present invention.

Referring next to FIG. 2, a representative prismatic lithium-ion battery cell (also referred to herein as prismatic can cell, prismatic cell, or more simply cell) 100 is shown, as well as its notional placement within a battery pack 10. Unlike pouch-style battery cell variants (not shown), which—although they have in common a generally flat, rectangular stackable shape in a manner generally similar to a prismatic cell—include numerous cells interspersed with cooling plates and other components, as well as thin peripheral edge and even thinner conductive foil tabs extending from the pouch edge, the prismatic cell 100 has the anode and cathode packaged within a welded rigid metal (for example, aluminum) rectangular canister, enclosure or similar self-supporting housing. While the cell 100 promotes scale-up and related design flexibility, increased care must be taken to promote more thorough sealing and thermal management approaches.

Shown in a partial cutaway view, the notional construction of cell 100 that is usable with the present invention includes positive and negative terminals 110, 120 projecting out of its top edge, along with a safety vent 130. Within the cell's 100 rigid outer case 140 are numerous positive and negative electrodes 150, 160 and non-conductive interspersed separators 170. Leads (in the form of tabs 180, 190) from each of the electrodes 150, 160 are gathered together inside the cell case 140 to feed the respective terminals 110, 120.

In the present embodiment, a group of numerous individual cells 100 are stacked—along with end plates 200 and the top section 300 that includes a battery interface unit 350 that includes (among other things) cell monitoring circuitry or the like, as well as pack-level positive and negative battery terminals 360, 370—into spaced brackets 400 with generally planar base 450 to form a box-like structure. The combined effect of the brackets 400 and the end plates 200 is that a generally U-shaped perforate enclosure in the form of a cage 500 that is formed into the box-like structure holds the end plates 200 and the stacked cells 100 in compression. In general, the cells 100 are stacked in a face-to-face relationship such that their edges substantially align to define a generally rectangular shape. The subassembly of cells 100 and end plates 200 are lowered into the spaced defined by cage 500 so that once engaged, the edges of the end plates 200 are slid into the channels of the brackets 400. As assembled, the pack 10 defines all six sides of the box-like structure to provide containment and support for the numerous individual battery cells 100 that are in turn supported by tray (not shown), as well as other balance of plant (BOP) equipment in vehicle 1. In one form, the slightly compressive properties of the cells 100 tend to push outwardly along the stacking axis A against the end plates 200. The subassembly of the cells 100 and end plates are then lowered into the spaced defined by cage 500 so that once engaged, the edges of the end plates 200 are slid into curled or angled slots formed the brackets 400. As assembled, the cage 500 (inclusive of the top section 300) defines all six sides of the box-like structure to provide containment and support for the numerous individual battery cells 100.

As mentioned above, the cells 100 define a rigid, rectangular (i.e., prismatic) shape such that they are easily stacked in a facingly-adjacent relationship along a stacking axis A-A. Busbars (not shown) may be placed on top of the one or more battery packs 10 to form an electric circuit between the pack-level positive and negative battery terminals 360, 370 and a suitable load (such as electric motor 15 for propulsion, as well as other systems used to provide functionality to vehicle 1.

Figure 3:
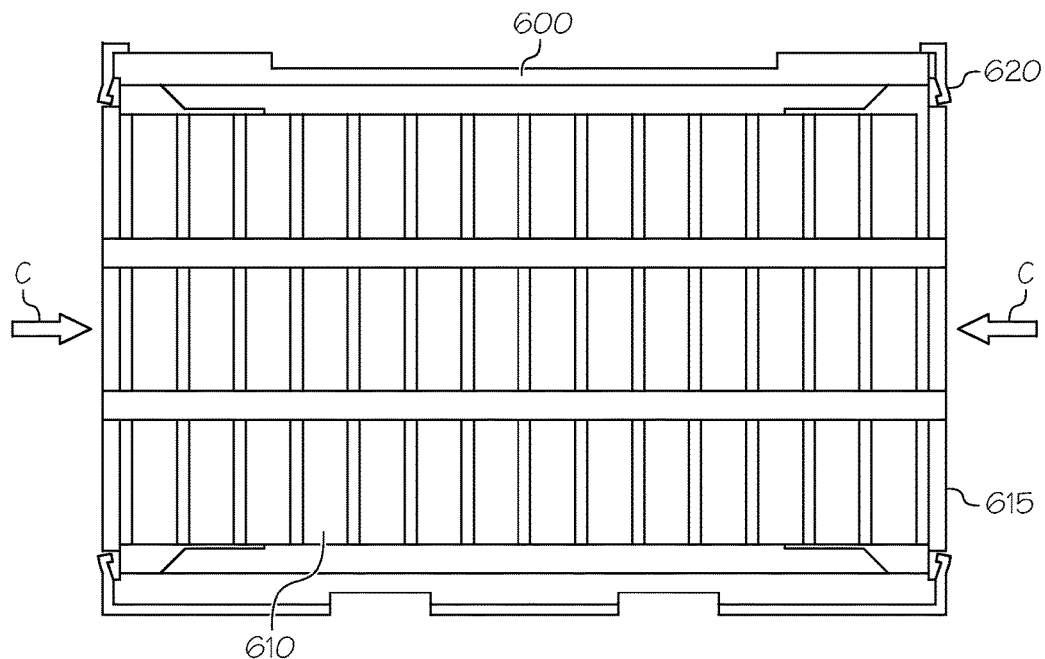
FIG. 3 shows an exemplary cooling frame according to an aspect of the present invention.
Figure 4:
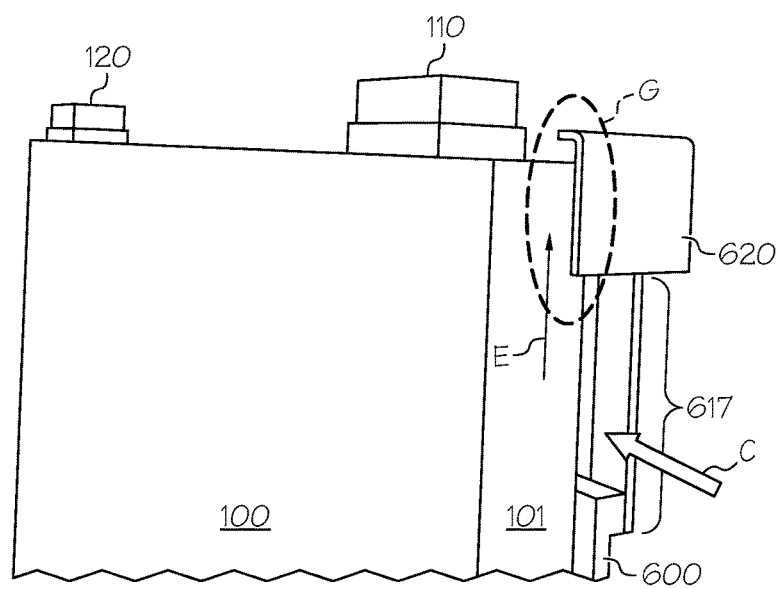
FIG. 4 shows a perspective view of the coupling of the battery cell to the frame according to an aspect of the present invention.

Referring next to FIGS. 3 and 4, an exemplary cooling frame 600 (FIG. 3) and joined cell 100 and frame 600 assembly (FIG. 4) where the entire face of the cell 100 fits within the surface area defined by the cooling frame 600 are shown. Each frame 600 has four cantilevered sealing members 620; one at each corner. Each frame further defines numerous generally rectangular-shaped apertures 610 to allow cooling air that is introduced via cooling path C along one or both lateral edges 615 to permit direct fluid communication between adjacent cell-frame assemblies 700 arranged in the housing or cage 500; this direct thermal communication promotes direct contact between the air and adjacent battery cell 100 surfaces on opposing sides of the frame 600 that is used (along with these cell surfaces) to define the inter-cell cooling volume (also referred to herein as the volumetric cooling chamber or channel). In one form, frame 600 is made out of a thermally and structurally durable plastic or resin, such as polypropylene, polycarbonate, ABS, nylon or blended plastics, such as Noryl™ or the like.

While the frame 600 is generally plate-like or planar in shape, raised portions 617 along the edges 615 help give the frame 600 three-dimensional attributes in order to facilitate the introduction and removal of the cooling air along cooling path C. The structure of frame 600 that defines the various apertures 610 provide support for the various cells 100 along the stacking axis A, giving the cells 100 something solid to press against. Furthermore, ridges 619 may be defined at various places on frame 600 to further define its three-dimensional attributes, including its enhanced rigidity and resulting increase in resistance to flexure or related deformation.

Figure 5A:
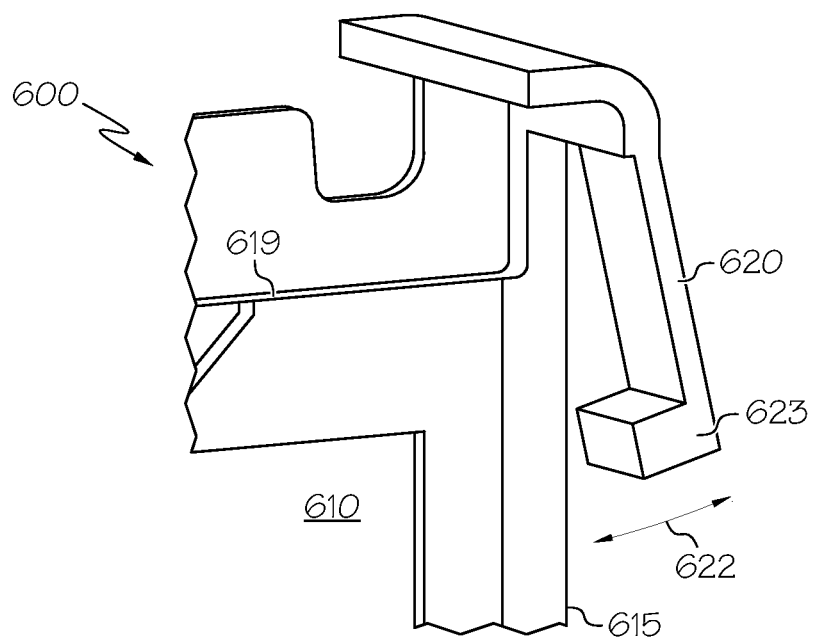
FIG. 5A shows the biased positioning of the frame's sealing member out of the way of the battery cell during placement of the cell adjacent the frame.
Figure 5B:
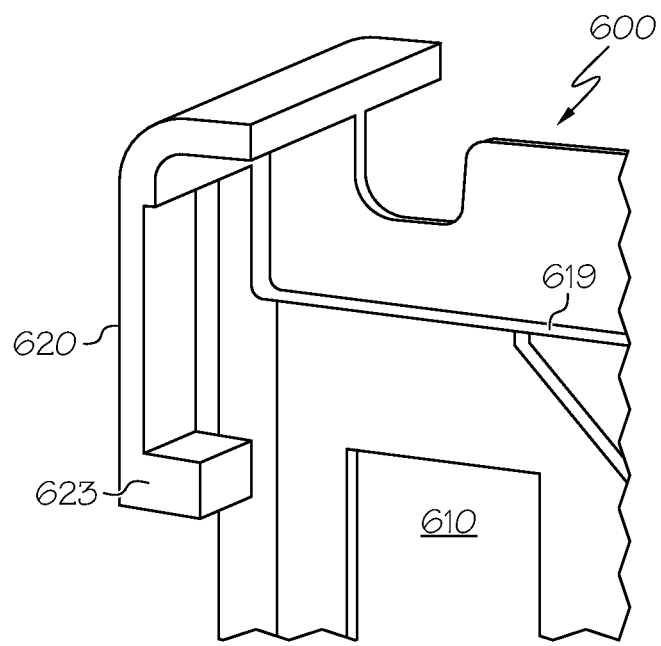
FIG. 5B shows the biased positioning of the frame's sealing member into engagement with the battery cell once the cell and frame have been assembled to one another.

During a conventional high-speed stacking (or assembly) process, a prismatic can cell is placed into cooperative fitting with a cooling frame. Because of build tolerances and the need to enable such automated, high speed assembly, traditional frames form a laterally-extending gap between the outward-facing edge of the cell and the corresponding inward-facing mating surface of the frame. The presence of such a gap means that some of the cooling air escapes upwardly rather than going through its intended cooling path and into the volumetric space between the faces of the cell and adjoining frame. Referring with particularity to FIGS. 5A and 5B in conjunction with FIGS. 3 and 4, the present invention solves this escaping cooling air problem through gap G by the pivoting movement along arc 622 of the sealing members 620; this allows for additional clearance (FIG. 5A) during the period where the cell 100 is being introduced to the frame 600, while inwardly-directed detents 623 close this gap G by the pressing of detent 623 flush against the generally planar outer edge surface 101 of cell 100 by the compressive force established by the inner wall of the relatively rigid cage 500; thereby cutting off escape path E. Thus, the sealing members 620 with detents 623 remain out of the path taken by the cell 100 along the stacking axis A during the high-speed assembly, but can be pressed inward along arc 622 upon installation of the assembled cell 100 and cooling frame 600 into the sidewalls of battery cage 500 (FIG. 5B).

Figure 6:
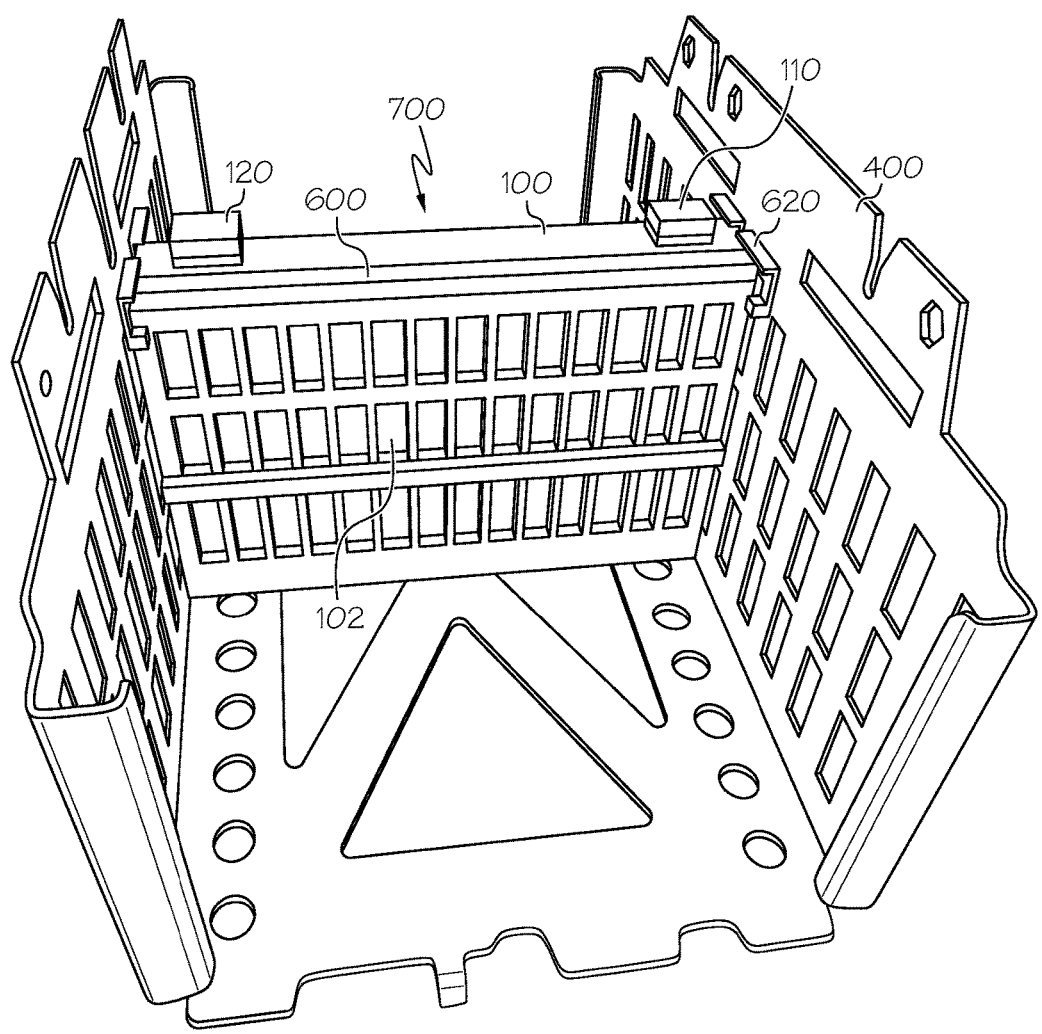
FIG. 6 shows the placement of a single cell and cooling frame assembly into a battery cage.

Referring next to FIG. 6, a single cell-frame assembly 700 (made up of cell 100 and a pair of cooling frames 600 on opposing cell 100 surfaces) is shown placed within the U-shaped bracket 400 that forms the underlying tray and sidewalls of battery cage 500. As can be seen, a plate-like major surface 102 of battery cell 100 is placed in facing cooperation with a frame 600 to define the sandwich-like structure of the cell-frame assembly 700. As can be seen, the normal outwardly-pivoted bias of the sealing members 620 is overcome by placement of the cell-frame assembly 700 into the relatively rigid confines of the sidewalls that make up brackets 400. In this way, the pre-assembled position of the sealing members 620 and their detents 623 remain out of the way during the introduction of the cell 100 to the frame 600 by a sufficient amount to ensure large enough gaps G to be compatible with high-speed assembly while being sized, shaped and flexible enough to promote closure of gap G (and concomitant reduction in coolant leakage) upon subsequent installation into cage 500. As can further be seen, the size and shape of both the cell 100 and the frame 600 is such that while both define a generally rectangular profile, the outer dimension of the frame 600 is slightly larger than the cell 100; significantly, the size and shape of the sealing member 620 of frame 600 is such that its outermost lateral projection—upon insertion into bracket 400—is coextensive with the remainder of the frame 600 lateral walls. Furthermore, the generally planar complementary contact surfaces between the outer lateral edges of the cell 100 and the adjacent inner edges of the frame 600 (as well as similar planar contact surfaces between a portion of the upper and lower edges of the cells 100 and the part of the sealing members 620 that overlap such portions) promote contact engagement to ensure a snug, secure fit of the former into the latter once inserted into the cage 500.

According to still yet another aspect, an automotive battery pack assembly is disclosed. The automotive battery pack includes a housing including an inner surface defining a cavity within the housing, a first battery cell and a second battery cell disposed within the cavity, a cooling frame disposed between the first battery cell and the second battery cell, and a sealing member formed on the cooling frame. The first battery cell and the second battery cell are arranged along a stacking axis. The first battery cell includes a planar face and an outer edge. The outer edge is disposed about the planar face. The outer edge of the first battery cell and the inner surface of the housing define a gap between the first battery cell and the housing. The cooling frame is coupled to the first battery cell to thereby define a cell-frame assembly. The cell-frame assembly defines a coolant flowpath fluidly coupled to the gap. The sealing member is resiliently biased toward a relaxed position outside a lateral edge of the cooling frame. The sealing member is resiliently deformed away from the relaxed position by engagement with the inner surface of the housing to thereby close the gap between the battery cell and the housing. The sealing member thereby inhibits escape of coolant from the coolant flowpath through the gap.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a battery or related source of electric power that in turn may be used to provide motive power. A device may also refer to a vehicle incorporating the source of motive power or other equipment that may make up, or be used in conjunction with, the vehicle or source of motive power; the nature of the device will be clear from the context. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context. Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An automotive battery pack assembly comprising:
a plurality of prismatic can battery cells arranged along a stacking axis;
a plurality of cooling frames, each cooling frame facingly interspersed between an adjacent pair of the cells and coupled to at least one of the cells to define a cell-frame assembly with a cooling path therebetween, each cooling frame defining at least one resiliently-biased sealing member formed thereon; and
a housing configured to contain the cell-frame assembly such that the sealing member is biased away from contact engagement with the respective one of the cells prior to placement of the cell-frame assembly into the housing, and deformed from a biased position by a surface of the housing upon placement thereby of the cell-frame assembly into the housing to form the contact engagement that defines a cooling path sealing surface between the frame and the cell within the corresponding cell-frame assembly.

2. The assembly of claim 1, wherein each of the frame and the cell defines substantially rigid rectangular shapes with substantially planar complementary surfaces.

3. The assembly of claim 2, wherein the housing defines a substantially rectangular structure sized such that upon the placement of the cell-frame assembly therein, outer lateral edges of the frame form a substantially planar connection with corresponding inner surfaces of the housing.

4. The assembly of claim 1, wherein the frame defines at least one recess formed therein such that upon creation of the cell-frame assembly, the recess and an adjacent surface of one of the cells define a volumetric cooling chamber therebetween.

5. The assembly of claim 4, wherein the frame defines at least one aperture formed therein such that direct fluid communication between adjacent cell-frame assemblies arranged in the housing is established.

6. The assembly of claim 1, wherein the sealing member defines a cantilever structure integrally formed with the frame.

7. The assembly of claim 6, wherein the frame is made from a plastic material.

8. The assembly of claim 6, wherein the cantilever structure defines a pivot point for the sealing member such that movement of a distal end of the sealing member moves in an arcuate path about the pivot point in response to a compressing force imparted by the housing.

9. The assembly of claim 8, wherein the contact engagement that defines the cooling path sealing surface between each the frame and the cell within the corresponding cell-frame assembly is defined substantially at the distal end of the sealing member.

10. The assembly of claim 9, wherein places of contact between the cell and portions of the frame that do not correspond to the sealing member are defined by substantially planar respective edge surfaces.

11. An automotive battery pack assembly comprising:
a housing including an inner surface defining a cavity within the housing;
a first battery cell and a second battery cell disposed within the cavity,
the first battery cell and the second battery cell arranged along a stacking axis,
the first battery cell including a planar face and an outer edge, the outer edge disposed about the planar face,
the outer edge of the first battery cell and the inner surface of the housing defining a gap between the first battery cell and the housing;
a cooling frame disposed between the first battery cell and the second battery cell, the cooling frame being coupled to the first battery cell to thereby define a cell-frame assembly, the cell-frame assembly defining a coolant flowpath fluidly coupled to the gap; and
a sealing member formed on the cooling frame, the sealing member being resiliently biased toward a relaxed position outside a lateral edge of the cooling frame, the sealing member being resiliently deformed away from the relaxed position by engagement with the inner surface of the housing to thereby close the gap between the battery cell and the housing, the sealing member thereby inhibiting escape of coolant from the coolant flowpath through the gap.

12. A method of attaching a cooling frame to a prismatic can battery cell in an automotive battery pack, the method comprising:

providing the frame with at least one resiliently-biased sealing member formed thereon;
placing the cooling frame adjacent the cell such that the cooling frame and the cell define a cell-frame assembly with a cooling path therebetween, and
placing the cell-frame assembly into a housing such that the sealing member that is biased outside of a footprint established by the cell is deformed by a surface of the housing to form a contact engagement that defines a sealing surface for the cooling path that is formed between the frame and the cell within the cell-frame assembly.

13. The method of claim 12, wherein a plurality of the cell-frame assemblies are placed into the housing to define the automotive battery pack.

14. The method of claim 12, wherein the contact engagement is formed along a lateral edge of the cell.

15. The method of claim 12, wherein the footprint is defined as a surface area projection along a stacking axis of a plurality of the cell-frame assemblies within the housing.

16. The method of claim 12, wherein the sealing member defines a cantilever structure integrally formed with the frame.

17. The method of claim 12, wherein the sealing member deforming takes place along a lateral dimension of the cell and the frame.

18. The method of claim 12, wherein the cell-frame assembly is formed as part of an automated process.

19. The method of claim 18, wherein each of the frame and the cell define substantially rigid rectangular shapes with planar complementary surfaces.

20. The method of claim 19, wherein the housing defines a substantially rectangular structure sized such that upon the placement of the cell-frame assembly therein, outer lateral edges of the frame form a substantially planar connection with corresponding inner surfaces of the housing.

* * * * *